United States Patent [19]
Nagel

[11] 3,953,990
[45] May 4, 1976

[54] LOCKING DEVICE
[76] Inventor: Alice R. Nagel, 68-01 60th Road, Maspeth, N.Y. 11378
[22] Filed: Mar. 30, 1973
[21] Appl. No.: 346,279

Related U.S. Application Data
[63] Continuation-in-part of Ser. No. 145,158, Dec. 4, 1970, abandoned.

[52] U.S. Cl............................. 70/18; 70/19; 70/45
[51] Int. Cl.² ............................. E05B 73/00
[58] Field of Search ............... 70/14, 15, 16, 17, 18, 70/19, 41, 44, 45, 46, 47, 29, 379

[56] References Cited
UNITED STATES PATENTS
| | | | |
|---|---|---|---|
| 490,537 | 1/1893 | Bremer | 70/18 X |
| 3,585,823 | 7/1971 | Nagel | 70/49 |

*Primary Examiner*—Robert L. Wolfe

[57] ABSTRACT

A chain having a spring-loaded locking tongs at one or both ends for snapping onto a link of the chain or onto a ring provided for that purpose. Collar and chain combinations especially adapted for use for animals are described.

13 Claims, 21 Drawing Figures

INVENTOR.
ALICE R. NAGEL
BY
SPARROW AND SPARROW
ATTORNEYS

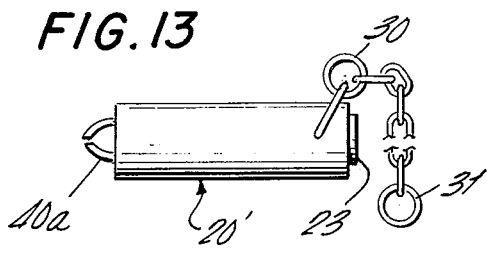
FIG.13
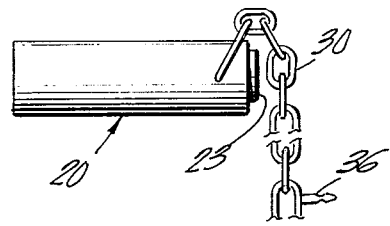
FIG.14
FIG.15
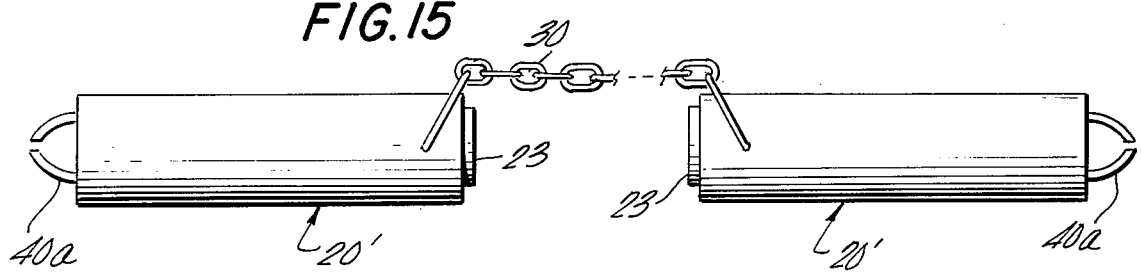
FIG.16
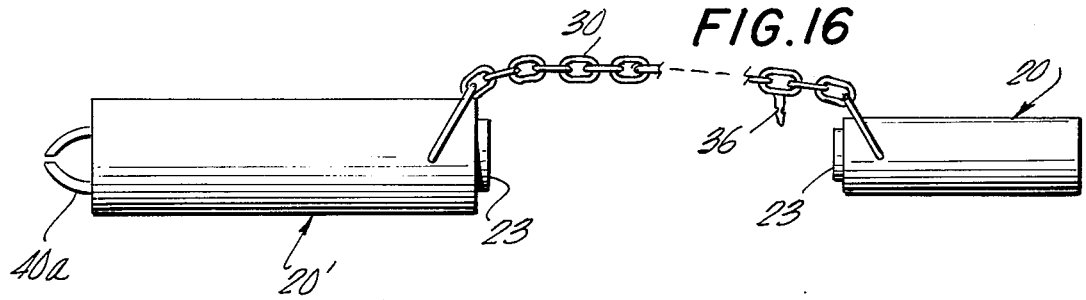
FIG.17
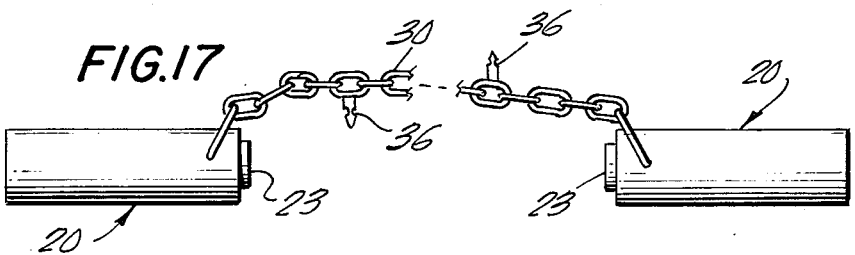
FIG.18
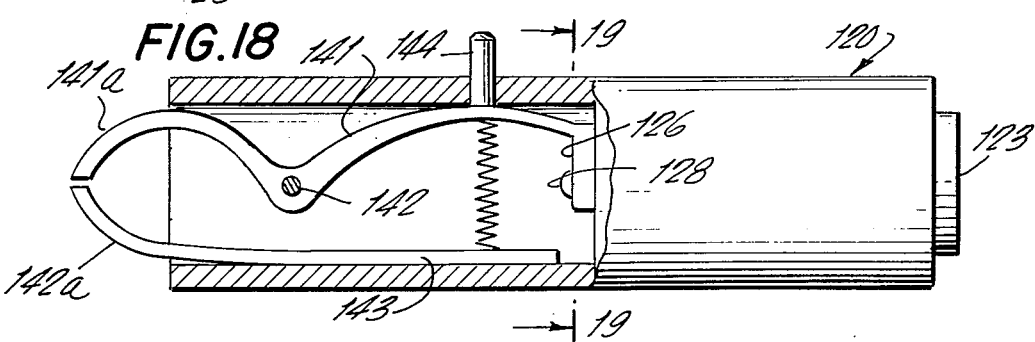
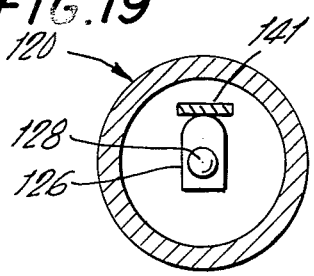
FIG.19
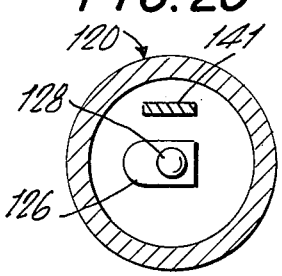
FIG.20
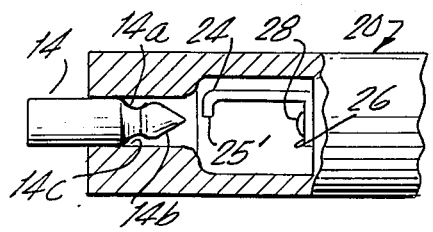
FIG.21

3,953,990

LOCKING DEVICE

CROSS-REFERENCE TO OTHER APPLICATIONS

This application is a continuation-in-part of my earlier application Ser. No. 145,158 filed Dec. 4, 1970 and now abandoned.

BACKGROUND OF THE INVENTION

The theft of animals, particularly dogs, has been a problem in the past. Such theft has often been conducted for laboratory use of the animals. Heretofore, no satisfactory antitheft device has been available. The conventional collars placed around the animal's neck was easily severed and removed. With such removal of the collar, the ownership of the animal could often not be identified. In view of the demand of costly animals, their theft has been encouraged. Unfortunately, there is no need to describe in detail the need for securing personal property, such as a bicycle, against theft.

Accordingly, it is an object of the present invention to provide an arrangement by which personal property and animals can be readily secured against theft. It is a particular object of the present invention to provide a simple and inexpensive anti-theft device through which the personal property or animal can be leashed to any desired structure. It is also an object of the present invention that the construction of the anti-theft device be such that it cannot be readily removed from the personal property or animal. Another object of the present invention is the provision of an animal anti-theft device that can be fitted comfortably about the neck of the animal.

SUMMARY OF THE INVENTION

A device by which the theft of personal property and animals is prevented. In its broadest aspects, the invention provides a chaining member, such as a linked chain, having cooperating locking members at each end. Preferably, the locking members comprise, at one end of the chain, a lock member having at least one spring biased locking finger means, and, at the other end of the chain, a link or ring that can be lockingly grasped by the locking finger means. Alternatively, the lock or ring can be replaced by a locking pin adapted to cooperate with the locking finger means.

In a preferred embodiment of the invention, the animal anti-theft device has a hardened steel collar with two hinged portions. The free end of one portion carries a pin which may be passed through any one of a plurality of holes in the free end of the other portion of the collar. The pin has a necked-down portion at its free end, which is designed to be gripped by a lock through spring-action fingers. The fingers release the pin by being separated through turning of the key in the lock. A hardened steel chain may be linked to the lock and secured to any structure for leashing the dog or other animal as desired. A duplicate lock fastened to the other end of a chain will secure the chain in place when cooperating with another duplicate pin secured also to the chain and spaced from the lock by an appropriate distance to permit wrapping the chain about a pole, for example.

BRIEF DESCRIPTION OF THE DRAWING

In the following description and in the claims, parts will be identified by specific names for convenience, but such names are intended to be as generic in their application to similar parts as the art will permit. Like reference characters denote like parts in the several figures of the drawing, in which

FIGS. 13 to 17 are plan views of alternative embodiments of the invention;

FIG. 18 is an elevational view of an alternative locking arrangement, with parts broken away; and FIGS. 19 and 20 are end views taken along Line 19—19 in FIG. 18 and showing the locking device in locked and open positions, respectively.

FIG. 21 is an elevational view, with parts broken away, showing an alternative embodiment of the invention.

DESCRIPTION OF THE PREFERRED EMBODIMENTS

Figure 1:
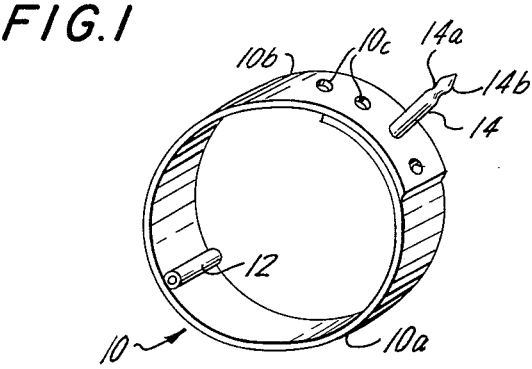
FIG. 1 is an isometric view of an adjustable hinge collar, in accordance with the present invention.

Referring to the drawing and, in particular FIG. 1, a collar 10 for a dog, for example, has two hinged portions, 10a and 10b. These two portions of the collar are hinged through the hinge 12 which permits free rotation of the portions 10a and 10b relative to each other, while being linked together.

The free end of the hinged portion 10a of the collar has secured to it a pin 14. This pin possesses a necked-down portion 14a and terminates in a V-shaped portion or pointed end 14b. The free end of the other hinged portion 10b contains a plurality of holes or openings 10c through which the pin 14 may be passed. In view of this hinged arrangement of the collar in combination with the spaced holes 10c and pin 14, the collar may be adjustably fitted to any dog's neck.

Figure 2:
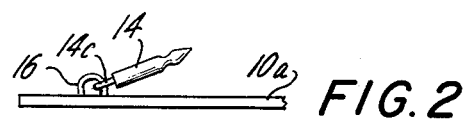
FIG. 2 is a partial elevational view and shows the closure construction for the collar of FIG. 1.

Whereas the pin 14 may be fixably secured to the collar portion 10a so that the pin projects perpendicular to the surface of the collar, the pin may also be freely pivotally linked to the hinged potion 10a, as shown in FIG. 2. Such pivotal joint, shown in FIG. 2, may be accomplished by providing a ring-shaped element 14c at the end of the pin 14, which engages a similar ring-shaped element 16 fixably secured to the portion 10a.

Figure 3:
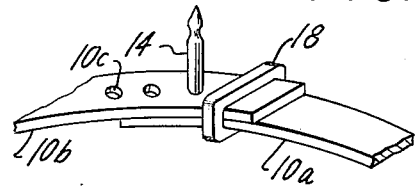
FIG. 3 is a partial isometric view and shows a strapping arrangement for holding together the ends of the collar of FIG. 1.

The collar 10 may be made of hardened steel so as to prevent severance thereof through ordinary cutting devices such as shears or saws. For the comfort of the animal, the interior of the collar 10 may be lined with soft cloth material or leather. A strap 18, shown in FIG. 3, may also be provided to hold the free ends 10a and 10b of the collar together so as to provide attractive appearance.

The pin 14 cooperates with a lock 20 which has conventional tumbler design and corresponding key 22. At the end of the lock opposite to where the key 22 is inserted, spring fingers 24 are attached in the locked position of the key 22 for its corresponding cylinder, the spring fingers 24 are substantially together so that only a minute space 24a exists between them. This space 24a permits the pointed end 14b of the pin 14 to be admitted between the spring fingers 24 and to force them apart when the lock 20 is pushed over the pin. Once the lock 20 has been pushed over the pin to the extent that the ends of the spring fingers 24 have dropped into the necked-down portion 14a, the lock is secured to the pin because the latter cannot no longer be withdrawn from between the spring fingers 24. To withdraw the pin 14 from the interior of the lock 20, it is essential that the spring fingers 24 be separated so that the ends of the fingers pass out of the necked-down portion 14a.

Figure 6:
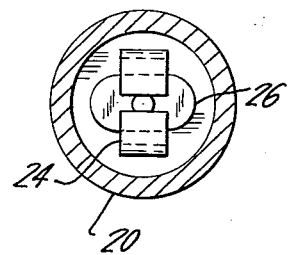
FIG. 6 is an end view of the locking device taken along Line 6—6 in FIG. 4, and shows the locking device in closed position.
Figure 7:
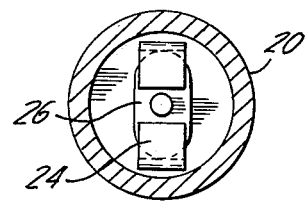
FIG. 7 is an end view of the locking device of FIG. 4 taken along Line 6—6 and shows the locking device when in open position.

Separation of the spring fingers 24 to release the lock 20 from the pin 14, is accomplished through the cam 26 which may be turned with the aid of the key 22. The cam 26 is rotatable about the pivot 28 which, in turn, is turned as a result of the turning of the key 22. In the locked position of the device, the cam 26 is positioned relative to the fingers 24, as shown in FIG. 6. In this locked position, the fingers 24 are substantially together at their ends, and the cam 26 is out of contact with these fingers. The spring action of the fingers 24 serves to keep these fingers substantially together. When the fingers 24 are in the position shown in FIG. 6, the pin 14 cannot be withdrawn or released from the interior of the lock when the ends of the spring fingers 24 extend into the necked-down portion 14a of the pin. To release the lock from the pin, it is necessary to rotate the cam 26 into the position shown in FIG. 7. Rotation of the cam into this position is accomplished by turning the key 22 to its open position. In the configuration of FIG. 7, the cam 26 forces the spring fingers 24 apart so that the ends of the fingers are removed or withdrawn from the necked-down portion 14a. The cam 26 when rotated in the position of FIG. 7 forces the spring fingers 24 apart against their spring action. After returning the key to its closed position, the spring fingers 24 are permitted to return to their normal position shown in FIG. 6, and the lock is ready for use for security purposes.

In operation, the key 22 is turned to its locked position and withdrawn from its cylinder. The lock 20 is then pushed over the pin 14 where it is held securely in place once the fingers 24 extend into the necked-down portion 14a. To release the lock 20 from the collar, the key 22 is simply reinserted into the lock and turned so that the cam 26 spreads the fingers 24 apart.

For conveniently leashing the dog, a chain 30 made of hardened steel, for example, may be linked to the lock 20 through a U-shaped member 32 which pivots relative to the barrel of the lock 20. The member 32 has vents 32a which penetrate holes on the surface of the lock 20, so as to hold the member 32 pivotally in place. A lock 34 similar to the lock 20 may be linked to the chain 30 at the other end thereof. Spaced from the lock 34 may be one or more pins 36 similar to construction in the pin 14. With this arrangement of the lock 34 and pin 36, the free end of the chain may be wrapped about a pole, for example, and locked thereto. By providing a plurality of such pins 36 spaced from each other, different diameter poles may be accommodated. By providing that the chain 30 be of hardened steel, it cannot be readily cut with shears or saws.

Figure 9:
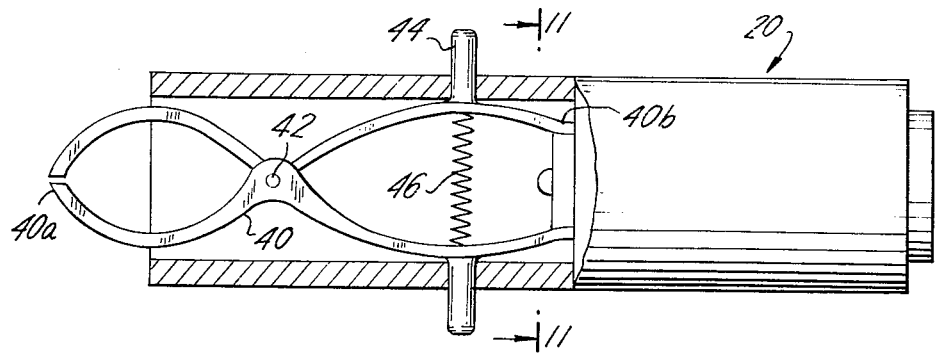
FIG. 9 is another embodiment of the locking device of FIG. 4.

In another embodiment of the invention shown in FIG. 9, the spring fingers of the device 20 are replaced by hook-shaped members 40 of device 20'. These hook-shaped members or tongs 40 pivot relative to each other about the pivot 42 which joins them together. Each of the members is also provided with a button or tab 44 projecting to the exterior of the lock device. In the locked position of the key of the device 20', a spring 46 maintains the frontal ends 48 of the members 40 substantially close together. Separation of the ends is accomplished by pressing the buttons 44 together with a pair of fingers of the user, for example.

Cooperating with the ends 40a of the tongs 40, is a ring-shaped member 48 secured to the collar portion 10a. In the locked position of the device for securing position, the opening of the member 48 contains the ends 40a.

Figure 8:
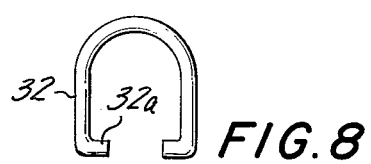
FIG. 8 is a front view and shows the construction of a member for linking a chain to the locking device in FIG. 4.
Figure 11:
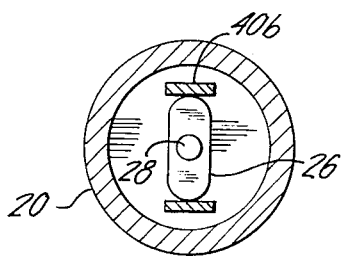
FIG. 11 is an end view taken along Line 11—11 in FIG. 9 and shows the locking device when in closed position.
Figure 12:
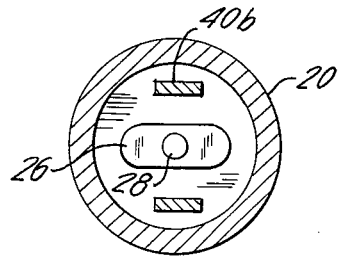
FIG. 12 is an end view taken along Line 11—11 in FIG. 9 and shows the locking device when in open position.

In operation of the arrangement of FIG. 9, the key for the lock 20' is turned to its open position. The cam 26 of the lock then takes the position shown in FIG. 12, in which the cam is out of contact with the rear 40b of the hook-shaped members 40. In this position of the cam 26, the buttons or tabs 44 may be brought together against the spring 46, so that the ends 40a are separated. With this separation of the ends 40a, they may be passed through the opening of the ring-shaped member 48, of the collar. Thereafter, the buttons 44 are released so that the spring 46 brings the ends 40a back together in a manner through which the members 40a pass through the opening of the ring-shaped member 48. By then turning the key of the lock 20 to its closed position, the cam 26 assumes the position shown in FIG. 11. In this closed position of the cam 26, the latter is in contact with the rear portions 40b of the tongs or hook-shaped members 40, and prevents, thereby, depression of the buttons 44. Thus, once the cam has been turned to the position of FIG. 11, the buttons 44 can no longer be depressed and the ends 40a can no longer be separated. The lock 20' is, in this manner, secured to the collar 10. A duplicate lock of this type shown in FIG. 9 can be attached to a chain similar to that shown in FIG. 4, for securing the chain and the dog to some structure or a pole, for example. The chain itself may be linked to the locks through such devices as shown in FIG. 8, as described above.

The pin 14 may be of either rectangular-shaped cross section or of a circular-shaped cross section. The pin may be made of hardened steel to prevent cutting thereof.

Several alternative embodiments of the invention are shown in FIGS. 13–21.

In FIG. 13, the locking device 20' of FIG. 9 is at one end of the chain 30 and the article of personal property can be secured to an object, such as a post, by wrapping the chain around the post and the article and snapping the ends 40a of the tongs 40 through a ring 31 or through a desired link closer to the locking device 20'. If desired, locking device 20' can be used at the end of a leash, with the locking device 20' being attached to a ring-like member on a dog collar such as ring 48 (FIG. 9).

Figure 4:
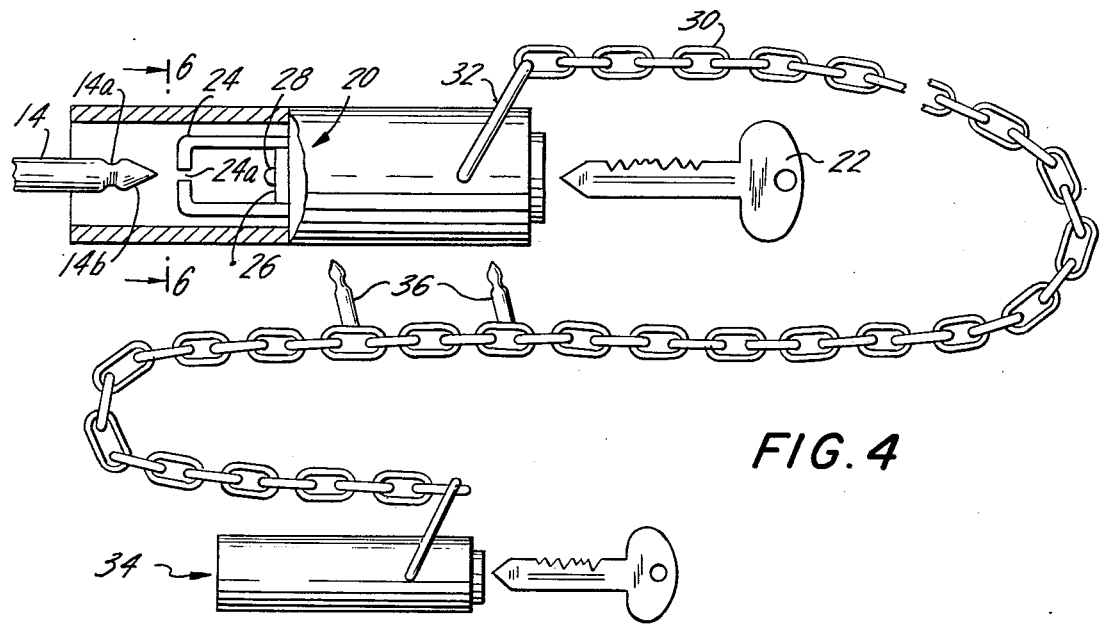
FIG. 4 is an elevational view of the locking arrangement, with parts broken away, and shows the locking device for locking the collar about the neck of the animal.
Figure 5:
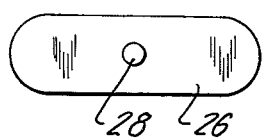
FIG. 5 is a front view of a cam used in the locking device of FIG. 4.

In FIG. 14, the locking device 20 of FIG. 4 is at one end of the chain 30 and one or more pins 36 are at desired locations, such as at the opposite end of the chain. If desired, locking device 20 can be snapped onto collar 10 of FIG. 1.

Figure 10:
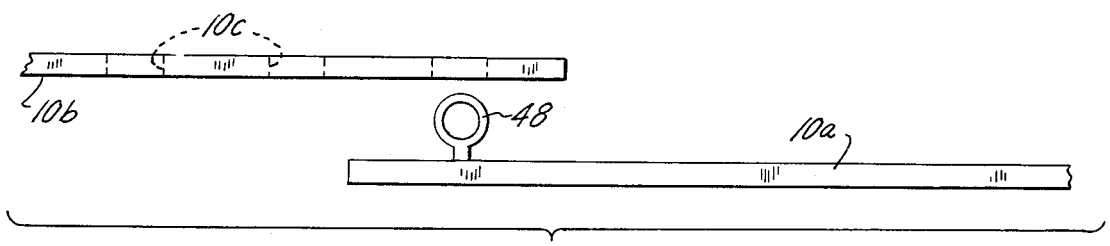
FIG. 10 is a side view showing the construction of a gripping member on the animal collar used in combination with the locking device of FIG. 9.

In FIG. 15, two locking devices 20' are provided, one at each end of the chain. In this way, one locking device may be looped aroound a post or the like and snapped through a desired link, while the other locking device may be looped around the article to be protected and snapped to a link near that locking device. Alternatively, the "free" locking device can be snapped onto the ring 48 of collar 10a (FIG. 10) or to a conventional dog collar (not shown) or any other ring-like member (not shown) attached to the article to be protected.

In FIG. 16, one end of the chain 30 is secured to locking device 20 while the other is secured to locking device 20', and one or more pins 36 are secured to the chain near locking device 20, one of which is shown.

In FIG. 17, two locking devices 20 and their associated pins 36 are used. The embodiments of FIGS. 16 and 17 are used to fasten one end of the chain around a post or the like and the other end around an article with the locking device 20 or 20' snapping onto the chain or a dog collar or the like, such as collar 10 of FIG. 1, having cooperating locking means.

In each of FIGS. 13-17, key 22 is inserted in cylinder 23 to lock or unlock the locking devices 20 and 20'.

In FIG. 18, an alternative locking device 120 is shown in the locked position. Device 120 has a lock cylinder 123 which is operated by a key (not shown). Turning the key to the locked position rotates cam 126 about its pivot 28 so that tong arm 141 may not be moved beyond the position shown in FIGS. 18 and 19. Turning the key to the unlocked position rotates the cam 126 to the position shown in FIG. 20, whereby arm 141 may be depressed by manual depression of push button 144. Tong arm 141 is pivotally mounted on pivot 142 such that depression of button 144 causes end 141a to move away from end 142a of arm 142, which is secured, as by welding, to locking device 120. Release of the depressed button 144 causes the arm 141 to return to its normal position shown in FIG. 18 by the action of spring 145. In this manner, the locking device 120 can be snapped onto any ring or similar member. Indeed, the locking device 120 can replace locking device 20' in any of the devices of FIGS. 9-13, 15 and 16.

In FIG. 21, the locking device 20' has only one spring finger 24', which is shown in the locked position. Pin 14 having necked-down portion 14a is inserted into device 20' through the constricted portion 14c. The end 25' of finger 24' will ride on the pointed end 14b of the pin until end 25' drops down into necked-down portion 14a. Constricted portion 14c of lock 20' provides support for pin 14 while it is pushed into lock 20' to force spring finger 24' to movably yield. To remove pin 14 from lock 20', it is necessary to turn cam 26 about pivot 28 by means of a key (not shown) in the same manner as lock 20 (FIGS. 4-7) is opened.

For simplicity of illustration, chaining member 30 has been shown as a linked chain, but other chaining members, such as cables or plastic- or rubber-covered chains and cables, can also be used.

While the invention has been described and illustrated with respect to a certain preferred example which gives satisfactory results, it will be understood by those skilled in the art after understanding the principle of the invention, that various changes and modifications may be made without departing from the spirit of the invention.

What I claim is:

1. A locking device, comprising chaining means, said chaining means including at least one ring-shaped member, and locking means having key-operated means movable by a key between locked and unlocked positions comprising a pair of tong-shaped members, at least one of which being movable relative to the other, for passing through said ring-shaped member and retaining said ring-shaped member when said key-operated means is in the locked position, a spring for retaining said tong-shaped members in closed position, and tab means on said tong-shaped members for facilitating manual movement of said tong-shaped members against said spring for opening said tong-shaped members, and said key-operated means includes cam means operable to allow said tong-shaped members to be manually opened when the key-operated means is in the unlocked position and to prevent said tong-shaped members from being manually opened when the key-operated means is in the locked position.

2. The device according to claim 1, wherein said ring-shaped member is at least one link of the chaining member.

3. The device according to claim 1, wherein both of said pair movable tong-shaped members are movable.

4. The device according to claim 3, wherein a pair of said locking means is secured to the chaining means, one at each end thereof.

5. The device according to claim 1, wherein one of said pair of tong-shaped members is stationary and the other is movable to and from said stationary member, and said tab means are on said movable tong-shaped member for facilitating manual movement of said movable tong-shaped member against said spring for opening said tong-shaped members.

6. The device according to claim 5, wherein a pair of said locking means is secured to the chaining means, one at each end thereof.

7. The device according to claim 1, wherein a pair of said locking means is secured to the chaining means, one at each end thereof, and wherein in one of said locking means both of said pair of tong-shaped members are movable, and in the other of said locking means, one of said pair of tong-shaped members is stationary and the other is movable to and from said stationary member, and said tab means are on said movable tong-shaped member for facilitating manual movement of said movable tong-shaped member against said spring for opening said tong-shaped members.

8. A security arrangement for animals comprising, in combination, a collar member for fitting about the neck of an animal; a ring-shaped securing member secured to one end of the collar member and having a holdable portion at its free end, said collar member having at least one opening at the other end of said collar for admitting said securing member; locking means having key-operated means comprising a pair of tong-shaped members movable by a key between locked and unlocked positions for passing through said ring-shaped member and retaining said ring-shaped member when said locking means is in the locked position; leash means connected at one end to said locking means; auxiliary locking means at the other end of said leash means for securing fixedly said leash means; and at least one auxiliary securing member on said leash means and spaced from said auxiliary locking means and cooperating with said auxiliary locking means for securing said leash means.

9. The arrangement according to claim 8, wherein said locking means comprise a pair of spring-finger means, said spring-finger means include a pair of movable tong-shaped members for passing through said ring-shaped member and retaining said ring-shaped member when said key-operated means is in the locked position, a spring for retaining said tong-shaped members in closed position, and tab means on said tong-shaped members for facilitating manual movement of said tong-shaped members against said spring for opening said tong-shaped members, and said key-operated means include cam means operable to allow said tong-shaped members to be manually opened when the key-operated means is in the unlocked position and to prevent said tong-shaped members to be manually opened when the key-operated means is in the locked position.

10. The arrangement according to claim 8, wherein said locking means comprise a pair of spring-finger means, said spring-finger means include a pair of tong-shaped members for passing through said ring-shaped member and retaining said ring-shaped member when said key-operated means is in the locked position, one of said pair of tong-shaped members being stationary and the other being movable to and from said stationary member, a spring for retaining said tong-shaped members in closed position, and tab means on said movable tong-shaped member for facilitating manual movement of said movable tong-shaped member against said spring for opening said tong-shaped members, and said key-operated means comprise cam means operable to allow said tong-shaped members to be manually opened when the key-operated means is in the unlocked position and to prevent said tong-shaped members to be manually opened when the key-operated means is in the locked position.

11. A lock having key-operated means movable by a key between locked and unlocked positions comprising a pair of tong-shaped members, at least one of which being movable relative to the other, a spring for retaining said tong-shaped members in closed position, and tab means on said tong-shaped members for facilitating manual movement of said tong-shaped members against said spring for opening said tong-shaped members, and said key-operated means includes cam means operable to allow said tong-shaped members to be manually opened when the key-operated means is in the unlocked position and to prevent said tong-shaped members from being manually opened when the key-operated means is in the locked position.

12. The lock according to claim 11, wherein both of said pair of tong-shaped members are movable.

13. The lock according to claim 11, wherein one of said pair of tong-shaped members is stationary and the other is movable to and from said stationary member, and said tab means are on said movable tong-shaped member for facilitating manual movement of said movable tong-shaped member against said spring for opening said tong-shaped members.

* * * * *